United States Patent
Numata et al.

(10) Patent No.: US 7,678,487 B2
(45) Date of Patent: Mar. 16, 2010

(54) DISCHARGED FUEL DILUTER

(75) Inventors: Hideo Numata, Utsunomiya (JP);
Shujiro Nozaki, Utsunomiya (JP);
Makoto Anazawa, Utsunomiya (JP);
Masahiro Matsutani, Utsunomiya (JP);
Akio Yamamoto, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 898 days.

(21) Appl. No.: 11/481,304

(22) Filed: Jul. 5, 2006

(65) Prior Publication Data

US 2007/0015031 A1    Jan. 18, 2007

(30) Foreign Application Priority Data

Jul. 7, 2005    (JP) .............................. 2005-198543

(51) Int. Cl.
*H01M 8/02* (2006.01)
*H01M 8/04* (2006.01)

(52) U.S. Cl. ....................................................... 429/34

(58) Field of Classification Search .................... 429/34
See application file for complete search history.

(56) References Cited

FOREIGN PATENT DOCUMENTS

| JP | 2002-289237 | | 10/2002 |
|---|---|---|---|
| JP | 2003-132915 | | 5/2003 |
| JP | 2004-127666 | | 4/2004 |
| JP | 2004-139815 | | 5/2004 |
| JP | 2005-011640 | | 1/2005 |
| JP | 2005-011641 | | 1/2005 |
| JP | 2006031999 A | * | 2/2006 |

* cited by examiner

*Primary Examiner*—Gregg Cantelmo
(74) *Attorney, Agent, or Firm*—Lahive & Cockfield, LLP; Anthony A. Laurentano, Esq.

(57) ABSTRACT

A discharged fuel diluter for a fuel cell includes: a dilution case which defines a dilution space; an offgas introduction pipe which penetrates the dilution case, supplying offgas discharged from the fuel cell in the case; a partitioning member having a rib provided in the dilution case; and a dilution gas pipe which penetrates the dilution case.

7 Claims, 6 Drawing Sheets

DISCHARGED FUEL DILUTER

BACKGROUND OF THE INVENTION

1. Field of the Invention

The present invention relates to a discharged fuel diluter having a dilution case in which anode offgas and dilution gas are supplied, diluting the anode offgas by mixing with the dilution gas.

Priority is claimed on Japanese Patent Application No. 2005-198543, filed Jul. 7, 2005, the content of which is incorporated herein by reference.

2. Description of Related Art

A fuel cell mounted on a fuel cell vehicle, producing electric power by performing an electrochemical reaction of reaction gases is known. In this type fuel cell, one having a solid polymer electrolyte membrane, with an anode and a cathode being provided at both faces is known. Fuel gas (such as hydrogen gas) is supplied to the anode and oxidizing gas (such as air containing oxygen) is supplied to the cathode, and the fuel cell produces chemical energy generated by oxidation-reduction of these reaction gases as electric energy.

In this fuel cell, water is generated in the cathode in power generation, and the water partially enters the anode through the solid polymer electrolyte membrane. In addition, a small amount of nitrogen in the air supplied to the cathode enters the anode through the solid polymer electrolyte membrane and is mixed with the hydrogen gas. Impurities in the anode such as the water and the nitrogen have the potential to make the power generation of the fuel cell unstable.

Especially in a circulation-type fuel cell system in which unreacted hydrogen discharged from the fuel cell (anode offgas) is mixed with fresh hydrogen gas for recycling and supplied to the fuel cell again for improving fuel utilization, the concentration of the aforementioned impurities in the anode increases with operating time.

In this type fuel cell, the anode offgas containing the impurities is discharged from an anode offgas line in which anode offgas circulates by opening a discharge valve at regular intervals. The concentration of the impurities is thus lowered.

Before discharging anode offgas outside of the fuel cell (into the air), the hydrogen concentration of the anode offgas is lowered by diluting with the dilution gas (e.g., air as cathode offgas which is discharged from the cathode).

Japanese Unexamined Patent Application, First Publication No. 2002-289237 discloses a treatment equipment of the related art. This discharged gas treatment equipment introduces a portion of the cathode offgas to a dilution case, dilutes the anode offgas in the dilution case in portions, and discharges the diluted anode offgas outside of a vehicle in portions.

As shown in Japanese Unexamined Patent Application, First Publication No. 2002-289237, it is preferable to constitute gas passage meandering by providing shields (partitioning members) in the case of a discharged fuel diluter, because dilution efficiency can be improved by making the gas passage longer while maintaining the volume of the case.

However, when the partitioning members are thin and have low rigidity, they vibrate due to the gas introduced in the case. This causes noise and lowers diluting performance by disturbing the gas flow.

Though making the partitioning members thicker is a possible solution to this problem, this increases the weight of the partitioning member. In addition, since the volume of the members also increases, the dilution case must be larger to maintain the volume of the gas passage therein. In the related art, securing the partitioning member's endurance has been an obstacle to weight reduction and downsizing of the diluter.

SUMMARY OF THE INVENTION

The present invention has an object to provide a discharged fuel diluter which can be weight-reduced and downsized while securing its endurance.

A first aspect of the present invention is a discharged fuel diluter for a fuel cell, including: a dilution case which defines a dilution space; an offgas introduction pipe which penetrates the dilution case, supplying offgas discharged from the fuel cell in the dilution case; a partitioning member having a rib provided in the dilution case; and a dilution gas pipe which penetrates the dilution case.

In the discharged fuel diluter of the present invention, the rigidity of the partitioning member can be increased by the rib formed on the partitioning member and vibration caused by the gas introduced in the dilution case can be prevented. Since the endurance of the partitioning member can be secured without making the partitioning member thicker, the discharged fuel diluter can be weight-reduced and downsized. In addition, the gas can be further mixed when the gas introduced in the dilution case encounters the rib. Therefore, its diluting performance can be improved regardless of the introduction pressure of the anode offgas. It is preferable to form the rib at a portion which faces the flowing direction of the introduced gas to improve the endurance of the partitioning member for the introduced gas and the diluting performance.

The rib may be integrally formed with the partitioning member by press forming. In this case, the number of parts can be less than when the rib is formed by the partitioning member and other parts. In addition, the partitioning member can be made more easily and further downsizing can be possible.

A turnback portion may be provided at a periphery of the partitioning member. In this case, the rigidity of the partitioning member in the thickness direction can be increased. Since the partitioning member attaches more closely to the dilution case, its vibration resistance can be further improved.

A rib may be provided in the dilution case. In this case, the strength of the dilution case can be increased and the vibration of the dilution case due to the pressure change of the introduced gas can be prevented. Therefore, the endurance of the dilution case can be secured without making the member constituting the dilution case thicker, and the discharged fuel diluter can be weight-reduced and downsized.

The dilution space may be divided by the partitioning member into a first space in which the offgas introduction pipe and the dilution gas pipe open and a second space in which the dilution gas pipe opens. In this case, the anode offgas and the dilution gas are supplied in the first space, pushed into the second space via the partitioning member, and mixed with each other in the second space. The mixing process thus can be performed effectively and well-diluted anode offgas can be discharged from the second space as mixed gas.

A second aspect of the present invention is a fuel cell system including: a fuel cell; a fuel tank which supplies fuel to the fuel cell; a compressor which supplies air to the fuel cell; and a discharged fuel diluter of the present invention connected to the fuel cell.

The fuel cell system of the present invention may further include a discharge valve provided upstream of the offgas introduction pipe, interrupting a flow of the offgas. In this case, the availability of the anode offgas can be greater than in the case in which the anode offgas is continuously supplied in the dilution case. Fuel efficiency can therefore be improved.

DETAILED DESCRIPTION OF THE INVENTION

An embodiment of a discharged fuel diluter of the present invention shall be described hereinafter with reference to FIGS. 1 to 7.

Figure 1:
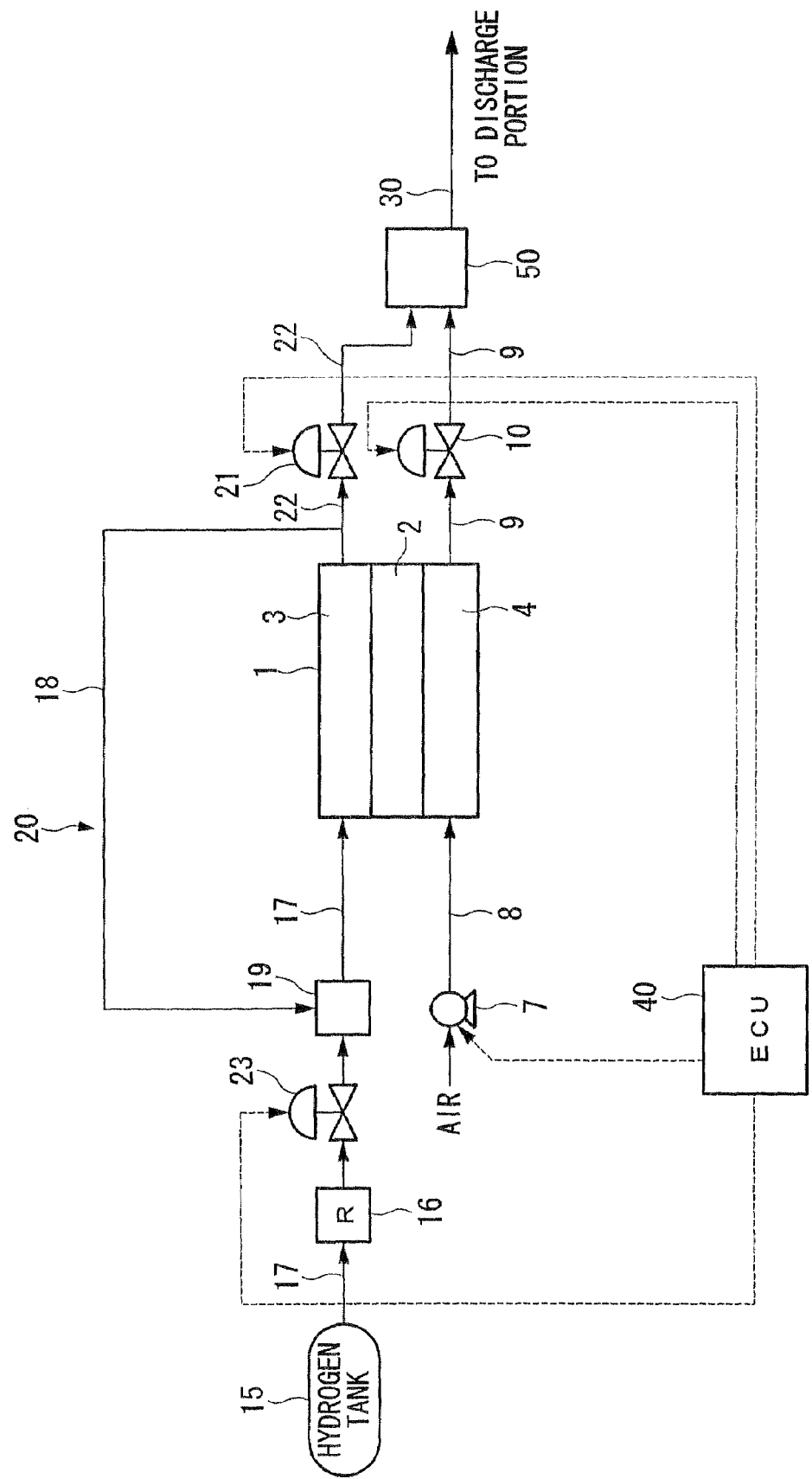
FIG. 1 is a block diagram showing a fuel cell system having a discharged fuel diluter according to an embodiment of the present invention.

FIG. 1 is a block diagram showing a fuel cell system having a discharged fuel diluter according to the present invention. In the present embodiment, the discharged fuel diluter is mounted in a fuel cell vehicle.

A fuel cell 1 produces electricity from a chemical reaction of reaction gases, having a constitution of stacking a plurality of cells in which a solid polymer electrolyte membrane 2 is sandwiched between an anode 3 and a cathode 4 (only one cell is shown in FIG. 1).

When hydrogen gas (a reaction gas) is supplied to the anode 3 as fuel gas and air containing oxygen (another reaction gas) is supplied to the cathode 4 as an oxidizing gas, hydrogen ions are generated in the anode 3 by a catalytic reaction and move to the cathode 4 through the solid polymer electrolyte membrane 2. The hydrogen ions undergo an electrochemical reaction with oxygen in the cathode 4 and electricity is generated with water. Since a portion of the water generated in the cathode side moves to the anode by reverse diffusion through the solid polymer electrolyte membrane 2, the generated water is present in the anode side.

Air is pressurized by a compressor 7 such as a super charger (S/C) to a predetermined pressure and supplied to the cathode 4 of the fuel cell 1 through an air supply passage 8. After being used for power generation, the air supplied to the fuel cell 1 is discharged from the fuel cell 1 to an air discharge passage 9 with the generated water in the cathode and introduced in discharged gas treatment equipment 50 via a pressure control valve 10. Hereinafter, the air supplied to the fuel cell 1 is referred to as "supplied air" and the air discharged from the fuel cell 1 is referred to as "discharged air" to distinguish them. Both the supplied air and the discharged air can be used as dilution gas.

On the other hand, hydrogen gas supplied from a hydrogen tank 15 is depressurized to a predetermined pressure by a regulator 16 while flowing through a hydrogen gas supply passage 17, adjusted to a predetermined flow volume by a flow volume control valve 23, and supplied to the anode 3 of the fuel cell 1 through an ejector 19. Unreacted hydrogen is discharged from the fuel cell 1 as anode offgas and aspirated in the ejector 19 through an anode offgas passage 18. The unreacted hydrogen joins fresh hydrogen gas from the hydrogen tank 15 and is supplied to the anode 3 of the fuel cell 1 again. In other words, the anode offgas discharged from the fuel cell 1 circulates in the fuel cell 1, passing through the anode offgas passage 18 and a part of the hydrogen gas supply passage 17 which is downstream of the ejector 19. In the present embodiment, the part of the hydrogen gas supply passage 17 which is downstream of the ejector 19 and the anode offgas passage 18 constitute a fuel gas circulation passage 20.

An anode offgas discharge passage 22 having a discharge valve 21 extends from the anode offgas passage 18 and is connected to the discharged gas treatment equipment 50. In the discharged gas treatment equipment 50, the anode offgas discharged from the anode offgas discharge passage 22 is diluted by the discharged air from the air discharge passage 9 and discharged to a discharge portion via a mixed gas discharge passage 30.

The electricity generated by the fuel cell 1 is supplied to a load such as a wheel-driving motor (not illustrated). An electrical control unit (ECU) 40 controls the revolutions of the compressor 7, the opening amount of the pressure control valve 10 and the flow volume control valve 23, and the opening and closing of the discharge valve 21.

In the fuel cell system of the aforementioned constitution, concentration of impurities (such as water and nitrogen) in the hydrogen gas flowing through the fuel gas circulation passage 20 increases with consecutive operation as described. This concentration increase sometimes makes the power generation of the fuel cell 1 unstable.

In this fuel cell system, the ECU 40 accordingly determines that the system needs to discharge the impurities and opens the discharge valve 21 when the fuel cell system is determined to have been operated for a certain period of time or when the stability of the power generation by the fuel cell 1 is determined to have decreased. The anode offgas containing the impurities is discharged from the anode offgas passage 18 to the discharged gas treatment equipment 50 through the anode offgas discharge passage 22 and the concentration of the impurities in the hydrogen gas flowing through the anode 3 is regulated to be less than a predetermined value. The power generation by the fuel cell 1 is thus maintained in a stable state.

Figure 2:
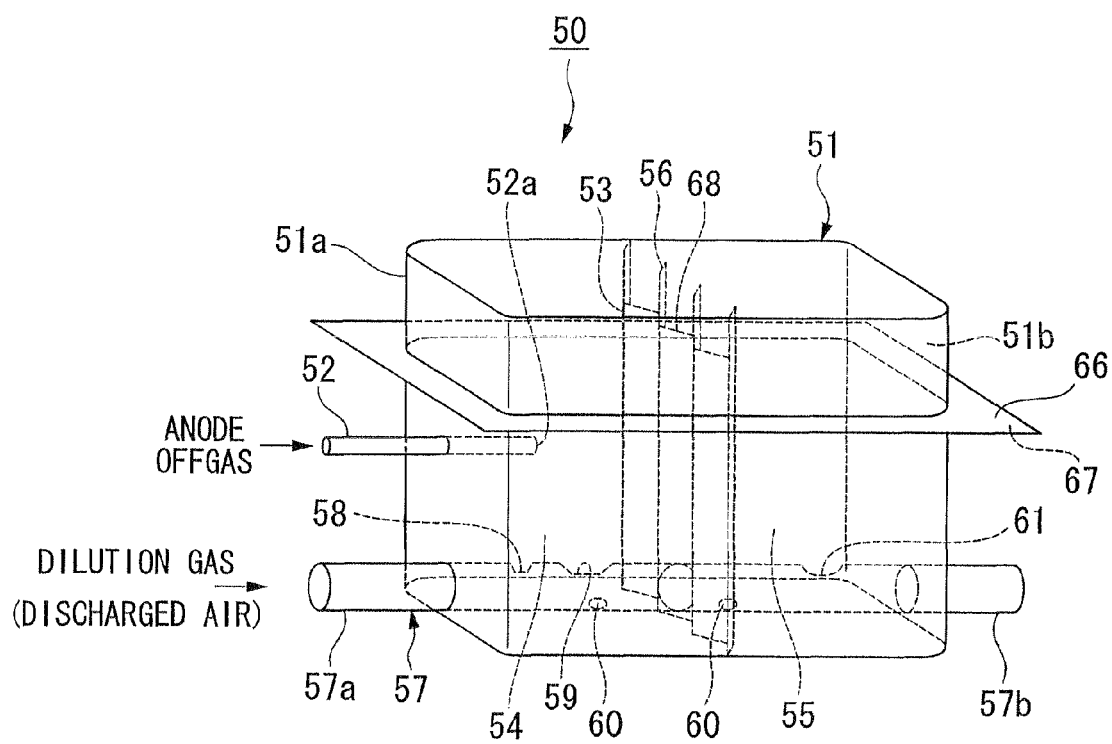
FIG. 2 is a perspective view of the discharged fuel diluter of the present embodiment.
Figure 3A:
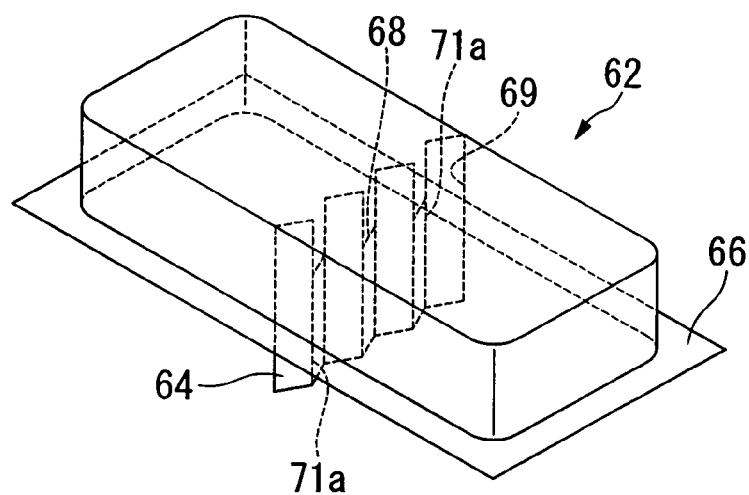
FIGS. 3A and 3B are exploded perspective views of the discharged fuel diluter.
Figure 3B:
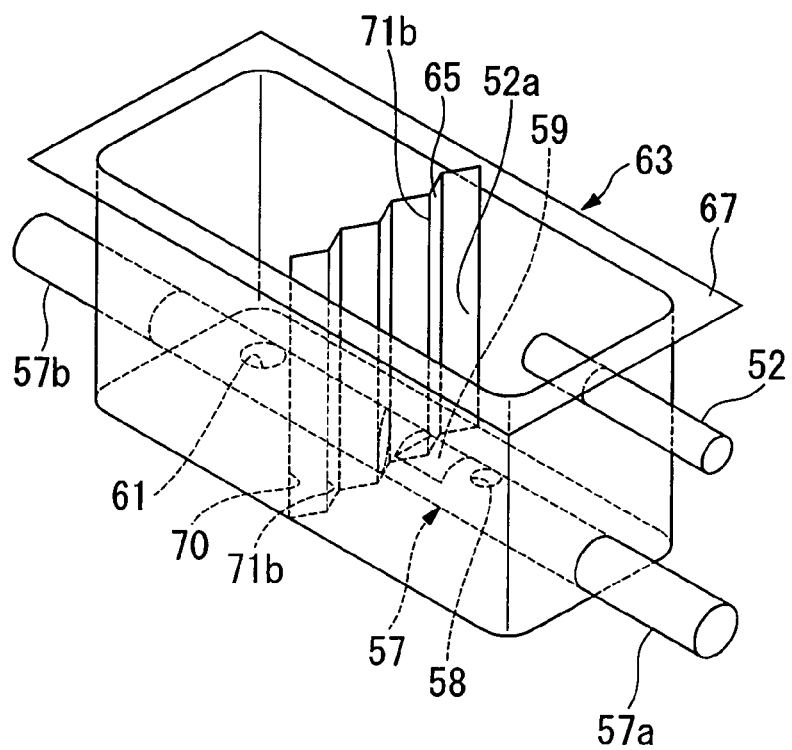

The constitution of the discharged gas treatment equipment 50 shall be described with reference to FIGS. 2 to 3B. The discharged gas treatment equipment 50 has a closed rectangular dilution case 51. The dilution case 51 is provided in the vehicle, with its central axis (e.g., an axis in the longitudinal direction of the dilution case 51 through the centers of gravity of end plates 51a and 51b) being set approximately horizontal. The dilution case 51 has uniform perpendicular rectangular cross sections in the central axis direction and corners thereof are rounded.

In the end plate 51a at the first end of the dilution case 51 in the central axis direction, an anode offgas introduction pipe 52 penetrates and is fixed thereto, with its central axis being set horizontal and slightly below the central axis of the dilution case 51. One end of the anode offgas introduction pipe 52 in the dilution case 51 is formed as an anode offgas discharge opening 52a. The anode offgas discharge passage 22 is connected to the other end of the anode offgas introduction pipe 52. When the discharge valve 21 opens, the anode offgas is introduced in the dilution case 51 from the anode offgas discharge opening 52a.

In addition, a partition 53 (a partitioning member) is provided approximately vertically in the dilution case 51, downstream of the anode offgas introduction pipe 52 and approximately central in the longitudinal direction of the dilution case 51.

The partition 53 has a rib portion 71 formed in a zigzag manner in its plan view and protruding vertically. The partition 53 also has notches 68 at regular intervals in its upper portion, and contacts and is fixed to the inside of the dilution case 51 with the exception of the notches 68. The space in the dilution case 51 is divided by the partition 53 into an upstream chamber 54 which communicates with the anode offgas introduction pipe 52 and a dilution gas discharge opening 58, which will be described later, and a downstream chamber 55 which communicates with a mixed gas discharge opening 61, which will also be described later. Spaces higher than the notches 68 function as a gas communication passage 56 which connects the upstream chamber 54 and the downstream chamber 55.

The notches 68 of the partition 53 are located sufficiently above the central axis of the dilution case 51, and the partition 53 is present at extended portion of the central axis of the anode offgas introduction pipe 52. Therefore, most of the anode offgas discharged from the anode offgas discharge opening 52a is released toward the partition 53 as shown in FIG. 2.

A dilution gas pipe (a dilution gas passage) 57 is fixed on the bottom surface inside the dilution case 51 (inner bottom), penetrating both end plates 51a and 51b of the dilution case 51 in the central axis direction. The dilution gas pipe 57 also penetrates the partition 53. The air discharge passage 9 is connected to an upstream end 57a of the dilution gas pipe 57 and the mixed gas discharge passage 30 is connected to a downstream end 57b of the dilution gas pipe 57. The discharged air from the cathode of the fuel cell 1 is discharged to the discharge portion, passing through the air discharge passage 9, the dilution gas pipe 57, and the mixed gas discharge passage 30.

The dilution gas discharge opening 58 is provided on the dilution gas pipe 57 in the upstream chamber 54, near the end plate 51a. The dilution gas discharge opening 58 is provided on the top of the dilution gas pipe 57 closer to the end plate 51a than the anode offgas discharge opening 52a. The discharged air is partially discharged in the upstream chamber 54 through the dilution gas discharge opening 58. In the present embodiment, since the dilution gas discharge opening 58 is directly provided on the dilution gas pipe 57, the dilution gas discharge opening 58 also functions as a communicating portion between the dilution gas discharge opening 58 and the dilution gas pipe 57.

A narrow portion 59 having a smaller cross section is provided in the dilution gas pipe 57, downstream of the dilution gas discharge opening 58 and in the upstream chamber 54, by denting the top of the dilution gas pipe 57. The flow volume of the discharged air introduced in the upstream chamber 54 from the dilution gas discharge opening 58 can be adjusted by changing a narrowing extent (the size of the cross section) of the narrow portion 59. In the present embodiment, the dilution gas pipe 57 has a uniform diameter except for the narrow portion 59.

A drain hole 60 is provided on the dilution gas pipe 57, downstream of the narrow portion 59 in both of the upstream chamber 54 and the downstream chamber 55. The liquid that flows through the anode offgas discharge passage 22 is removed in the dilution gas pipe 57 through the drain holes 60.

The mixed gas discharge opening 61 is provided on the dilution gas pipe 57 in the downstream chamber 55, downstream of the drain hole 60 and near the end plate 51b. The mixed gas discharge opening 61 is provided on the top of the dilution gas pipe 57, and the gas in the downstream chamber 55 is discharged in the dilution gas pipe 57 through the mixed gas discharge opening 61.

The dilution case 51 includes an upper member 62 and a lower member 63. These components are now described with reference to FIGS. 3A and 3B. FIG. 3A is a perspective view of the upper member 62, and FIG. 3B is that of the lower member 63. As shown in these drawings, each of the members 62 and 63 has a body formed like a container having a bottom and an opening, and respective flange portions 66 and 67, which extend from the opening, bending outward. The members 62 and 63 are disposed so that the flange portions 66 and 67 face each other, and the dilution case 51 is formed by welding the flange portions 66 and 67.

An upper partitioning plate 64 is welded to the upper member 62 at the center in the longitudinal direction of the dilution case 51 so as to protrude from the opening. A lower partitioning plate 65 is welded to the lower member 63 in the same manner as the upper portioning plate 64. The notches 68 are formed at the upper portion of the upper partitioning plate 64. The partitioning plates 64 and 65 are supported by direct contact such that the end of each member (the portion protruding from the opening) overlaps and constitutes the partition 53. Ribs 71a and 71b are formed on the partitioning plates 64 and 65 respectively so as to protrude in the height direction. The ribs 71a and 71b constitute the rib portion 71.

Since the dilution case 51 is constituted by the upper member 62 and the lower member 63, and the partition 53 is constituted by the upper partitioning plate 64 and the lower partitioning plate 65, the partitioning plates 64 and 65 can be positioned in the members 62 and 63 with high accuracy. The attachment process of the partitioning plates 64 and 65 to the members 62 and 63 can be performed on each contact portion 69 and 70 from both faces of each partitioning plate 64 and 65, from each opening of the members 62 and 63 with the partitioning plates 64 and 65 being positioned in the members 62 and 63. This significantly reduces workload and manufacturing time, even though they are fixed by welding, which is advantageous in strength. The strength of the partition 53 can be increased by welding the partitioning plates 64 and 65 to the members 62 and 63. Since the length of the gas flow passage defined by the partition 53 in the case 51 can be secured at a certain extent, the diluting performance can be secured.

In addition, since the notches 68 formed on the upper partitioning plate 64 function as a gas communication opening, the contact area of the upper member 62 and the partitioning plate 64 can be reduced. The amount of welding can therefore be reduced and the attachment of the partitioning plate 64 to the member 62 can be easier, while maintaining the rigidity needed for the partitioning plate 64.

In the present embodiment, the dilution gas pipe 57 and the anode offgas introduction pipe 52 is disposed only in the lower member 63. In addition, the dilution gas discharge opening 58 and the mixed gas discharge opening 61 are formed on the dilution gas pipe 57, and the anode offgas discharge opening 52a is formed in the anode offgas introduction pipe 52. Due to this constitution, the lower member 63 can be attached to the upper member 62 in a state in which the pipes 57 and 52 are disposed in the lower member 63. The dilution case 51 accordingly can be mounted in a fuel cell system easily. Furthermore, when the maintenance of the pipes 57 and 52 disposed in the dilution case 51 is needed, it can be performed by removing the upper member 62. This makes the handling of the diluter easier.

Since the rib portion 71 formed on the partition 53 has a shape protruding in the height direction, it extends along a gas communication passage from the dilution gas discharge opening 58 to the mixed gas discharge opening 61. The hydrogen stored in the dilution case 51 can therefore be discharged efficiently.

Next, the operations of the discharged gas treatment equipment 50 shall be described.

In the discharged gas treatment equipment, the discharged air from the cathode 4 of the fuel cell 1 is introduced in the dilution gas pipe 57 through the air discharge passage 9 and the pressure control valve 10 while the air from the compressor 7 is supplied to the cathode 4 of the fuel cell 1. The discharged air flows in the dilution gas pipe 57 toward the mixed gas discharge passage 30 and is partially released in the upstream chamber 54 through the dilution gas discharge opening 58.

As described, the discharge valve 21 opens when the ECU 40 determines that the system needs to discharge impurities, and the anode offgas is discharged through the anode offgas passage 18. The anode offgas is introduced in the anode offgas introduction pipe 52 of the discharged gas treatment equipment 50 via the anode offgas discharge passage 22 and released in the upstream chamber 54 through the anode offgas discharge opening 52*a*.

Therefore, the pressure inside the dilution case 51 does not increase when the anode offgas is not released in the upstream chamber 54 from the anode offgas discharge opening 52*a* (which means the discharge valve 21 is closed). However, when the discharge valve 21 is opened and the anode offgas is released in the upstream chamber 54, the pressure inside the dilution case 51 rapidly increases. In other words, the pressure inside the dilution case 51 changes in accordance with the discharge timing of the anode offgas.

The rigidity of the partition 53 of the dilution case 51 in the present embodiment can be improved due to the rib portion 71 formed thereon. The strength and resistance to pressure of the partition 53 can also be improved by welding the partitioning plates 64 and 65 to the members 62 and 63. The dilution case 51 therefore has substantial mechanical strength (pressure strength) with respect to its inner pressure and deformations due to the breathing of the dilution case 51 (repeated stress), and is able to resist the aforementioned stress without an extra reinforcing structure.

The anode offgas released through the anode offgas discharge opening 52*a* changes its flow direction and decreases its velocity by encountering the partition 53. Then the anode offgas spreads in the entire space in the upstream chamber 54 with an appropriate flow velocity. Since the rigidity of the partition 53 is increased by forming the rib portion 71, the vibration due to the aforementioned encounter of the anode offgas can be prevented. After encountering the rib portion 71 of the partition 53, the anode offgas spreads and is mixed with the discharged air. The anode offgas is thus partially mixed with the discharged air in the upstream chamber 54, flows into the downstream chamber 55 through the gas communication passage 56, and flows toward the mixed gas discharge opening 61. During this process, the mixed gas from the upstream chamber 54 is further mixed with the gas in the downstream chamber 55. Then the gas in the downstream chamber 55 is discharged into the dilution gas pipe 57 through the mixed gas discharge opening 61, is mixed with the gas flowing in the dilution gas pipe 57, and is discharged in a well-diluted state.

In the present embodiment, the moving distance of the gas in the dilution case 51 can be extended by the partition 53. The moving distance can also be extended by forming the dilution gas discharge opening 58 near the first end of the dilution case 51 in the central axis direction and forming the mixed gas discharge opening 61 near the second end of the dilution case 51 in the same direction. As a result, the retention of the gas in the dilution case 51 can be extended so as to secure the duration required for dilution. The anode offgas thus can be surely diluted.

Since the rigidity of the partition 53 can be increased by forming the rib portion 71 thereon, the vibration due to the anode offgas and the discharged air introduced in the dilution case 51 can be prevented. Since the endurance of the partition 53 can be secured without increasing its thickness, the treatment equipment can be weight-reduced and downsized.

In addition, the amount of the discharged air introduced in the upstream chamber 54 through the dilution gas discharge opening 58 can be adjusted by altering the narrowing extent (size of the cross section area) in the narrow portion 59 provided downstream of the dilution gas discharge opening 58 in the dilution gas pipe 57 as described. The amount of the dilution gas released in the upstream chamber 54 through the dilution gas discharge opening 58 can be set to an appropriate value by setting the narrowing extent in the narrow portion 59 to a predetermined one. The anode offgas thus can be well-diluted and discharged.

Incidentally, the anode offgas introduced in the dilution case 51 includes water as a liquid or a gaseous state (vapor) as described. Since the anode offgas is released from the anode offgas introduction pipe 52 toward the partition 53 in the present embodiment, the liquid included in the anode offgas encounters the partition 53, adheres thereto, and vertically falls along the partition 53. The vapor in the anode offgas also condensates when encountering the partition 53, and the condensate liquid also falls along the vertically-provided partition 53. That is, the partition 53 catches the water in the anode offgas and helps the water to gather on the bottom of the dilution case 51.

The water in the anode offgas (both liquid and vapor) is also caught on the inner surface of the dilution case 51. The liquid which adheres to the inner surface of the dilution case 51 and the condensate liquid which condensates on the inner surface falls along the inner surface of the dilution case 51.

The liquid gathered at the inner bottom of the dilution case 51 through the aforementioned process is removed in the dilution gas pipe 57 through the drain holes 60 and discharged to the mixed gas discharge passage 30 with the mixed gas.

In the present embodiment, the drain holes 60 are provided on the lower half of the dilution gas pipe 57, near the inner bottom of the dilution case 51. The liquid gathered at the bottom of the dilution case 51 is therefore easy to be discharged and the liquid remaining in the dilution case 51 can be reduced. The drain performance of the treatment equipment can thus be improved.

Since the narrow portion 59 is provided slightly upstream of the drain hole 60 in the present embodiment, liquid aspirating power can be increased. The liquid gathered in the dilution case 51 can therefore be aspirated effectively and discharged swiftly. The reason why the aspirating power can be increased is that the downstream pressure of the narrow portion 59 is lower than the upstream pressure of the narrow portion 59.

In addition, since the dilution gas discharge opening 58, the mixed gas discharge opening 61, and the drain holes 60 are directly provided on the dilution gas pipe 57 in the present embodiment, the structure of the discharge gas treatment equipment can be made simpler.

OTHER EMBODIMENTS

The present invention is not limited to the aforementioned embodiment. For example, though the aforementioned embodiment has only one partition, there may be a plurality.

Figure 4:
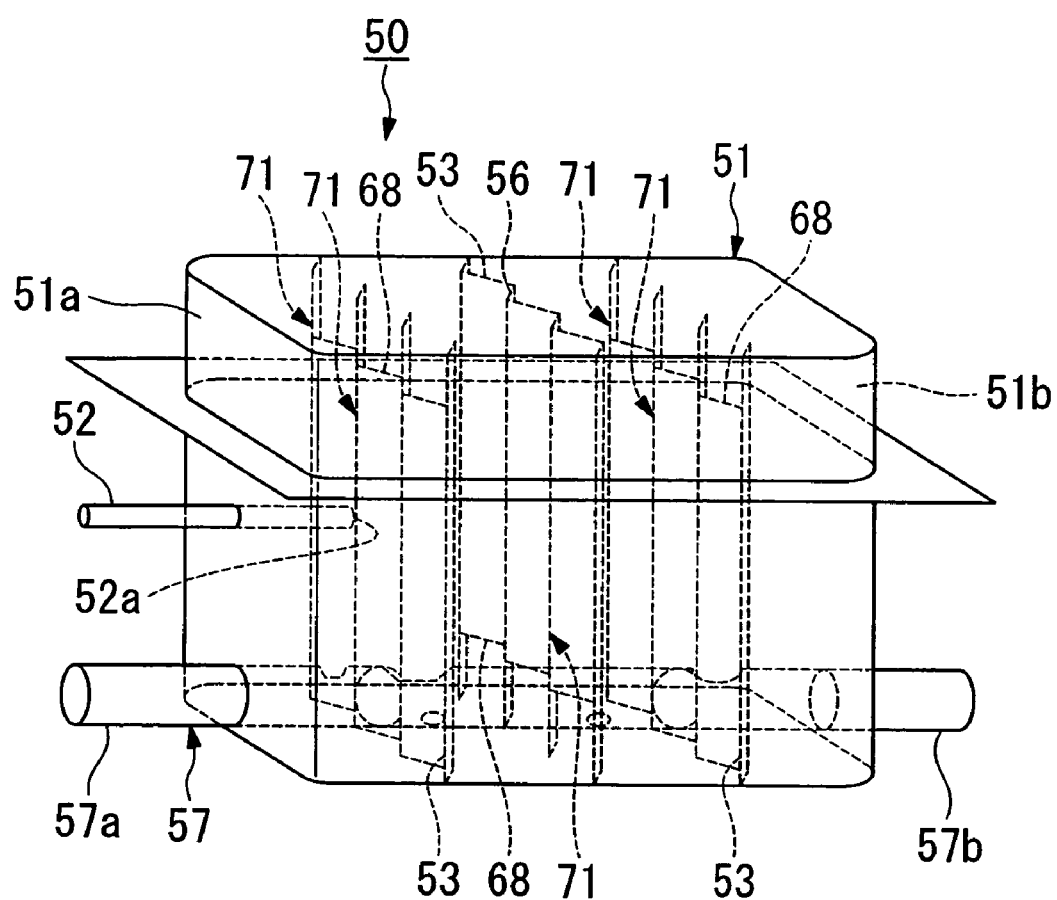
FIG. 4 is a main portion perspective view of a modification of the discharged fuel diluter.
Figure 5A:
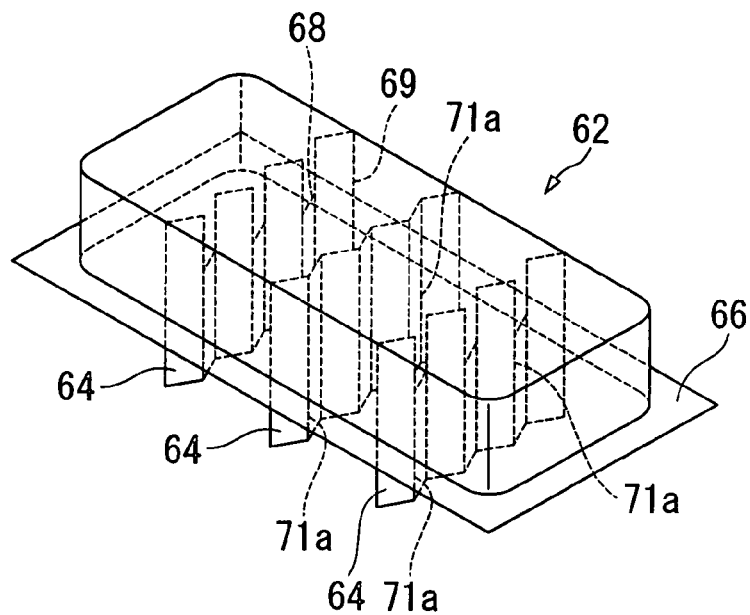
FIGS. 5A and 5B are exploded perspective views of the discharged fuel diluter shown in FIG. 4.
Figure 5B:
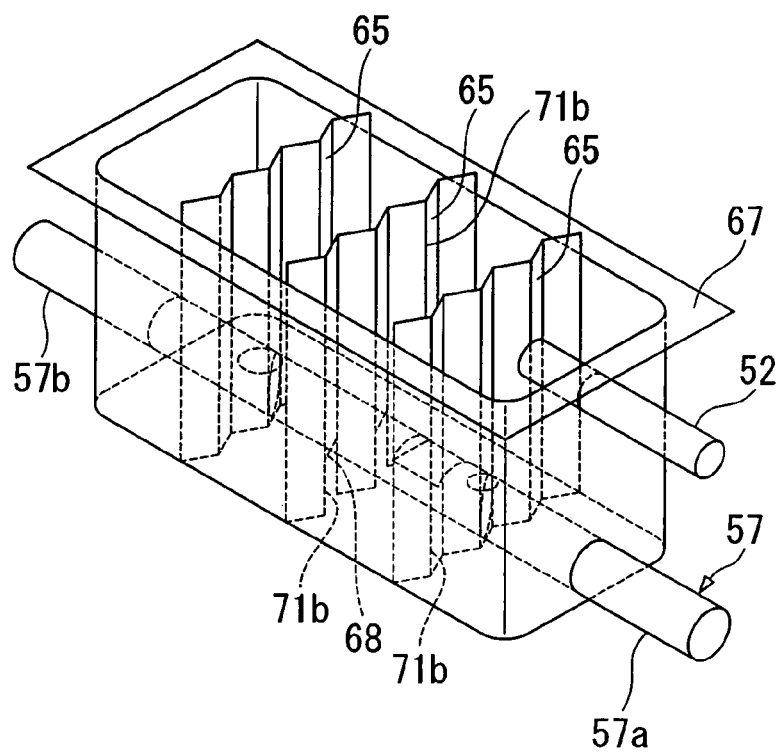

For example, as shown in FIGS. 4 to 5B, the gas flow passage in the dilution case 51 may be extended by forming the gas flow passage with multiple turnarounds (e.g., three) by providing two more partitions 53 having notches 68 in the upper partitioning plates 64 between the partition 53 and the end plates 51a and 51b.

Since the frequency that the anode offgas and the discharged air encounters the rib portion 71 can be increased by providing the rib portion to each partition 53, the diffusion and mixture of the anode offgas and the discharged air can be enhanced. In addition, since the endurance of the partitions 53 is increased by the rib portions 71, vibration can be prevented even under high frequency of encountering of the aforementioned gases. Since the diffusion and mixture of the gases can be enhanced and the gas flow passage can be extended by the partitions 53, the diluting performance can be highly improved. In FIGS. 4 to 5B, the pipes are omitted for simplification.

Figure 6:
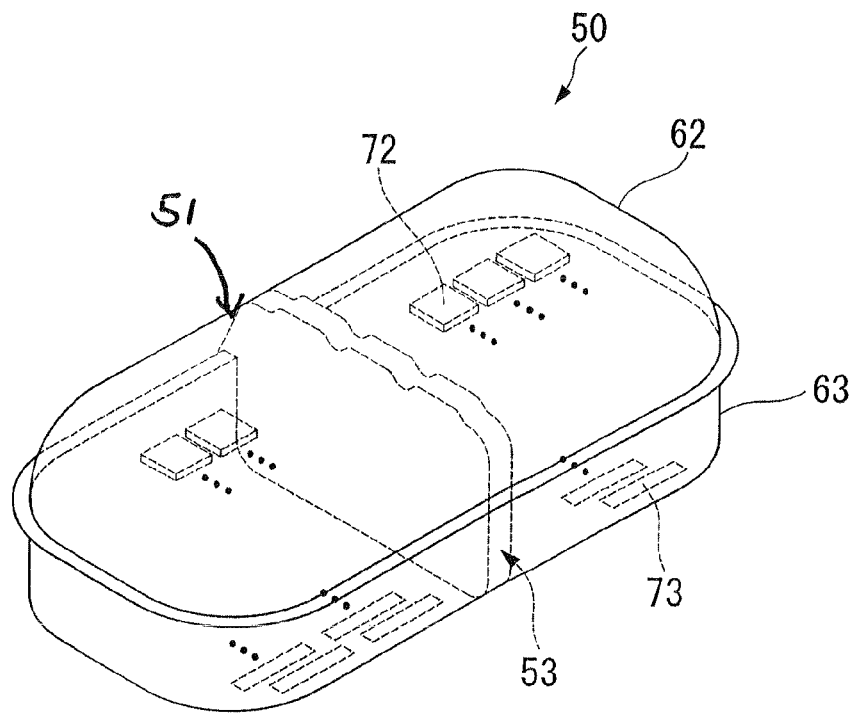
FIG. 6 is a main portion perspective view of another modification of the discharged fuel diluter shown in FIG. 2.

As shown in FIG. 6, rib portions 72 and 73 may be provided on the inner surface of the case 51 in a protruding manner. In this case, the strength of the case 51 itself can be improved, and vibration of the case 51 due to the pressure change of the discharged air and the anode offgas introduced in the case 51 without thickening the members constituting the case 51. The diluter accordingly can be weight-reduced and downsized.

Figure 7:
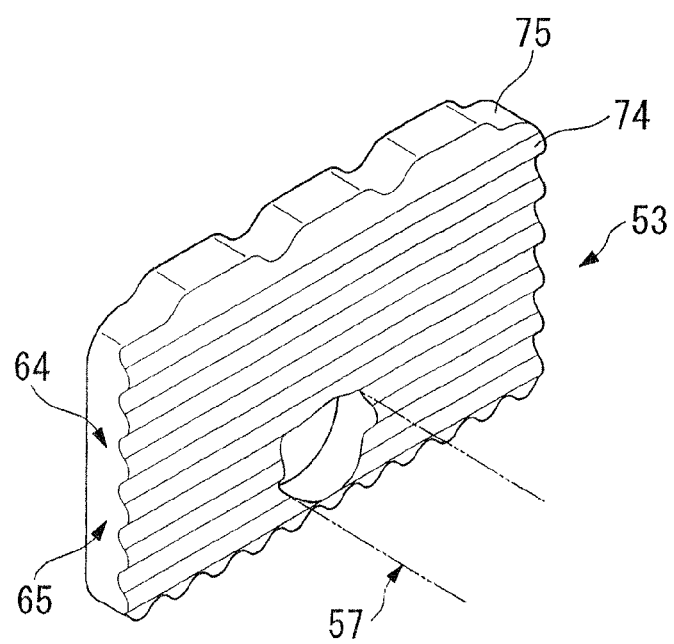
FIG. 7 is a main portion perspective view of the partitioning member of the discharged fuel diluter shown in FIG. 6.

As shown in FIG. 7, a turnback portion 75 may be provided by folding the periphery of the partition 53 in an approximately vertical manner. The turnback portion 75 can increase the rigidity of the partition 53 in the thickness direction. Since the turnback portion 75 increases the contact area of the partition 53 with the members 62 and 63, the partition 53 can be tightly fixed to the members 62 and 63 by welding the turnback portion 75. A rib portion 74 extending horizontally is formed on the partition 53 shown in FIG. 7. The rib portion 74 can efficiently reduce the momentum of the introduced anode offgas by the partition 53. Hydrogen can therefore be prevented from being discharged from the mixed gas discharge opening 61 more surely, while the anode offgas maintains its momentum at the time of introduction.

Though the dilution case has a rectangular cross section in the aforementioned embodiment, the cross section may be a circle or an ellipse. When constituting the cross section perpendicular to the central axis of the dilution case by a curve which is convex outward along the entire periphery thereof (i.e., an ellipse), the resistance to pressure can be further improved. In addition, liquid can be gathered at the bottom in the vertical direction of the dilution case (i.e., the inner bottom of the dilution case), and the liquid does not accumulate at other portions. Among others, when providing the major axis of the ellipse vertically, since the velocity of the liquid falling along the inner surface of the dilution case can be accelerated, the liquid can accordingly be gathered at the bottom of the dilution case swiftly. Though making the cross section of the dilution case an ellipse has the aforementioned merits, it is not limited thereto. The diluter of the present invention has great layout flexibility because there is no limitation in the shape of its dilution case.

Though the discharged air discharged from the cathode of the fuel cell (the cathode offgas) is used as the dilution gas in the aforementioned embodiment, it is not limited thereto. For example, the supplied air can also be used.

In addition, the anode offgas discharge opening, the dilution gas discharge opening, and the mixed gas discharge opening may be formed in the case or on the surface of the case.

Though the rib portion can be manufactured easier and downsized by being formed with the partition by press forming, it is not limited thereto. The rib portion and the partition may be formed as separate parts.

Furthermore, though the dilution case is constituted by the upper member and the lower member, each having a partitioning plate, it is not limited thereto. For example, the partitioning plate may be provided only one of the members.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A discharged fuel diluter for a fuel cell, comprising:
   a dilution case which defines a dilution space;
   an offgas introduction pipe which penetrates the dilution case, supplying offgas discharged from the fuel cell in the dilution case;
   a partitioning member having a rib provided in the dilution case; and
   a dilution gas pipe which penetrates the dilution case.

2. The discharged fuel diluter according to claim 1, wherein
   the rib is integrally formed with the partitioning member by press forming.

3. The discharged fuel diluter according to claim 1, wherein
   a turnback portion is provided at a periphery of the partitioning member.

4. The discharged fuel diluter according to claim 1, wherein
   a rib is provided in the dilution case.

5. The discharged fuel diluter according to claim 1, wherein
   the dilution space is divided into a first space in which the offgas introduction pipe and the dilution gas pipe open and a second space in which the dilution gas pipe opens at the partitioning member.

6. A fuel cell system comprising:
   a fuel cell;
   a fuel tank which supplies fuel to the fuel cell;
   a compressor which supplies air to the fuel cell; and
   a discharged fuel diluter according to claim 1 connected to the fuel cell.

7. The fuel cell system according to claim 6, further comprising
   a discharge valve provided upstream of the offgas introduction pipe, interrupting a flow of the offgas.

* * * * *